(12) United States Patent
Nakada

(10) Patent No.: US 8,942,506 B2
(45) Date of Patent: Jan. 27, 2015

(54) IMAGE PROCESSING APPARATUS, IMAGE PROCESSING METHOD, AND PROGRAM

(75) Inventor: Yuichi Nakada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/479,062

(22) Filed: May 23, 2012

(65) Prior Publication Data

US 2012/0301044 A1 Nov. 29, 2012

(30) Foreign Application Priority Data

May 27, 2011 (JP) ................................. 2011-119255

(51) Int. Cl.
- G06K 9/40 (2006.01)
- H04N 5/232 (2006.01)
- H04N 5/225 (2006.01)

(52) U.S. Cl.
CPC ......... *H04N 5/23229* (2013.01); *H04N 5/2258* (2013.01)
USPC ....................................................... 382/255

(58) Field of Classification Search
None
See application file for complete search history.

(56) References Cited

U.S. PATENT DOCUMENTS

| | | | | |
|---|---|---|---|---|
| 7,623,726 | B1 * | 11/2009 | Georgiev | 382/255 |
| 2002/0140823 | A1 * | 10/2002 | Sakurai et al. | 348/207.99 |
| 2005/0195317 | A1 * | 9/2005 | Myoga | 348/370 |
| 2008/0218868 | A1 * | 9/2008 | Hillis et al. | 359/619 |
| 2008/0259176 | A1 * | 10/2008 | Tamaru | 348/222.1 |
| 2009/0096897 | A1 * | 4/2009 | Saito | 348/241 |
| 2009/0136148 | A1 * | 5/2009 | Lim et al. | 382/255 |
| 2009/0167928 | A1 * | 7/2009 | Asukabe et al. | 348/345 |
| 2009/0207282 | A1 * | 8/2009 | Sasaki et al. | 348/240.3 |
| 2009/0245685 | A1 * | 10/2009 | Makii | 382/276 |
| 2009/0284610 | A1 * | 11/2009 | Fukumoto et al. | 348/208.99 |
| 2010/0149384 | A1 * | 6/2010 | Iijima et al. | 348/241 |
| 2010/0157110 | A1 * | 6/2010 | Hatanaka et al. | 348/241 |
| 2010/0177979 | A1 * | 7/2010 | Kotani | 382/255 |
| 2011/0043666 | A1 * | 2/2011 | Mitsumoto | 348/241 |
| 2012/0063697 | A1 * | 3/2012 | Han et al. | 382/255 |
| 2012/0314104 | A1 * | 12/2012 | Nishiyama | 348/241 |

FOREIGN PATENT DOCUMENTS

| | | |
|---|---|---|
| JP | 2008-541051 A | 11/2008 |
| JP | 2011-10194 A | 1/2011 |

(Continued)

OTHER PUBLICATIONS

Liu, S., Chia, L., and Rajan, D., Attention Region Selection with Information from Professional Digital Camera, Nov. 2005, MM '05, pp. 391-394.*

(Continued)

*Primary Examiner* — Stephen R Koziol
*Assistant Examiner* — Jonathan S Lee
(74) *Attorney, Agent, or Firm* — Canon U.S.A., Inc. IP Division

(57) ABSTRACT

An image processing device that sets weighting factors for captured image data and interpolation image data region by region based on in-focus state information indicating in-focus states of the respective regions, and synthesizes the captured image data and the interpolation image data based on the weighting factors. A weighting factor for interpolation image data in an in-focus region is smaller than a weighting factor for interpolation image data in at least a part of a region other than the in-focus region.

11 Claims, 17 Drawing Sheets

(56) References Cited

FOREIGN PATENT DOCUMENTS

| | | | |
|---|---|---|---|
| JP | 2011010194 A | * | 1/2011 |
| WO | 2008/050904 A1 | | 5/2008 |

OTHER PUBLICATIONS

Kubota, A., Aizawa, K., and Chen, T., Reconstructing Dense Light Field from Array of Multifocus Images for Novel View Synthesis, Jan. 2007, IEEE Transactions on Image Processing, vol. 16, No. 1, Jan. 2007, pp. 269-279.*

Aizawa, K., Kodama, K., and Kubota, A., Producing Object-Based Special Effects by Fusing Multiple Differently Focused Images, 2000, IEEE Transactions on Circuits and Systems for Video Technology, vol. 10, No. 2, pp. 323-330.*

Uncalibrated Synthetic Aperture for Defocus Control; Natsumi Kusumoto et al.;Osaka University; 2009. CVPR 2009. IEEE.

* cited by examiner

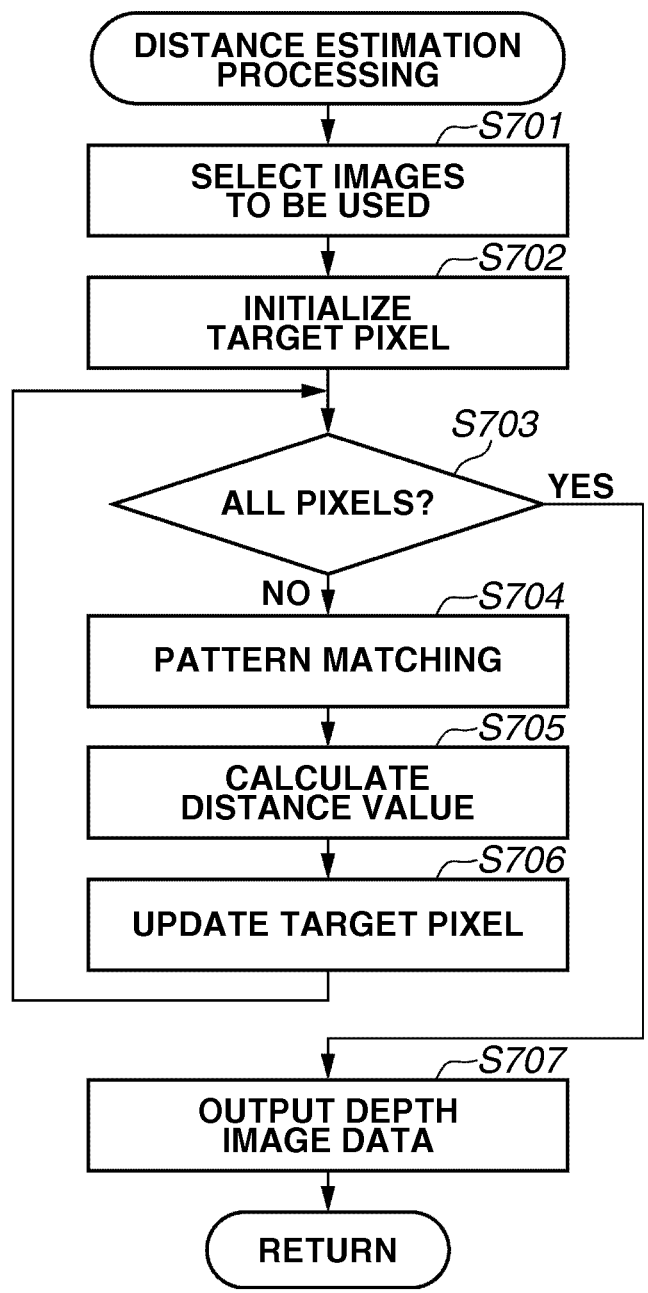

FIG.12

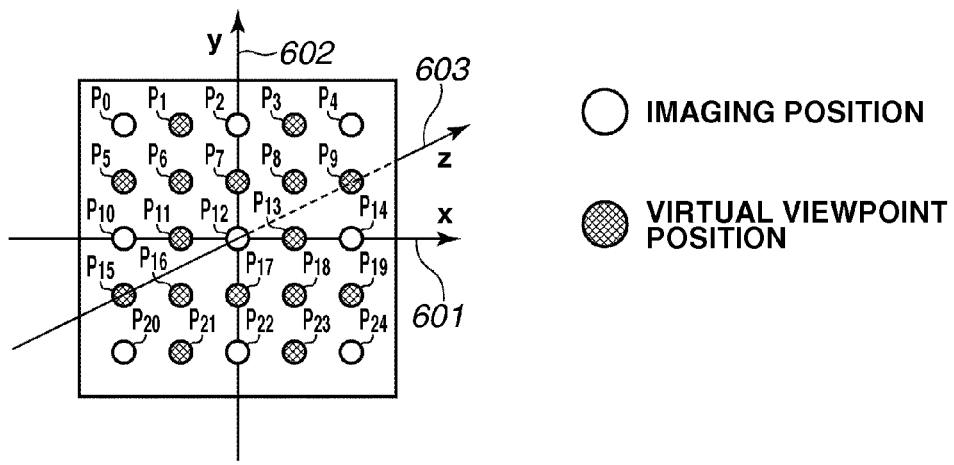

○ IMAGING POSITION

◉ VIRTUAL VIEWPOINT POSITION

| A(0) | A(1) | A(2) | A(3) | A(4) |
|---|---|---|---|---|
| A(5) | A(6) | A(7) | A(8) | A(9) |
| A(10) | A(11) | A(12) | A(13) | A(14) |
| A(15) | A(16) | A(17) | A(18) | A(19) |
| A(20) | A(21) | A(22) | A(23) | A(24) |

=

| 0.024 | 0.035 | 0.039 | 0.035 | 0.024 |
|---|---|---|---|---|
| 0.035 | 0.048 | 0.054 | 0.048 | 0.035 |
| 0.039 | 0.054 | 0.060 | 0.054 | 0.039 |
| 0.035 | 0.048 | 0.054 | 0.048 | 0.035 |
| 0.024 | 0.035 | 0.039 | 0.035 | 0.024 |

VIRTUAL DIAPHRAGM PARAMETERS 311

| $W_{in}(0)$ | $W_{in}(1)$ | $W_{in}(2)$ | $W_{in}(3)$ | $W_{in}(4)$ |
|---|---|---|---|---|
| $W_{in}(5)$ | $W_{in}(6)$ | $W_{in}(7)$ | $W_{in}(8)$ | $W_{in}(9)$ |
| $W_{in}(10)$ | $W_{in}(11)$ | $W_{in}(12)$ | $W_{in}(13)$ | $W_{in}(14)$ |
| $W_{in}(15)$ | $W_{in}(16)$ | $W_{in}(17)$ | $W_{in}(18)$ | $W_{in}(19)$ |
| $W_{in}(20)$ | $W_{in}(21)$ | $W_{in}(22)$ | $W_{in}(23)$ | $W_{in}(24)$ |

=

| 0.079 | 0 | 0.123 | 0 | 0.079 |
|---|---|---|---|---|
| 0 | 0 | 0 | 0 | 0 |
| 0.123 | 0 | 0.192 | 0 | 0.123 |
| 0 | 0 | 0 | 0 | 0 |
| 0.079 | 0 | 0.123 | 0 | 0.079 |

WEIGHTING FACTORS IN IN-FOCUS REGION: $W_{in}$

| $W_{out}(0)$ | $W_{out}(1)$ | $W_{out}(2)$ | $W_{out}(3)$ | $W_{out}(4)$ |
|---|---|---|---|---|
| $W_{out}(5)$ | $W_{out}(6)$ | $W_{out}(7)$ | $W_{out}(8)$ | $W_{out}(9)$ |
| $W_{out}(10)$ | $W_{out}(11)$ | $W_{out}(12)$ | $W_{out}(13)$ | $W_{out}(14)$ |
| $W_{out}(15)$ | $W_{out}(16)$ | $W_{out}(17)$ | $W_{out}(18)$ | $W_{out}(19)$ |
| $W_{out}(20)$ | $W_{out}(21)$ | $W_{out}(22)$ | $W_{out}(23)$ | $W_{out}(24)$ |

=

| 0.024 | 0.035 | 0.039 | 0.035 | 0.024 |
|---|---|---|---|---|
| 0.035 | 0.048 | 0.054 | 0.048 | 0.035 |
| 0.039 | 0.054 | 0.060 | 0.054 | 0.039 |
| 0.035 | 0.048 | 0.054 | 0.048 | 0.035 |
| 0.024 | 0.035 | 0.039 | 0.035 | 0.024 |

WEIGHTING FACTORS IN OUT-OF-FOCUS REGION: $W_{out}$

FIG.14A

| $W_{in}(0)$ | $W_{in}(1)$ | $W_{in}(2)$ | $W_{in}(3)$ | $W_{in}(4)$ |
|---|---|---|---|---|
| $W_{in}(5)$ | $W_{in}(6)$ | $W_{in}(7)$ | $W_{in}(8)$ | $W_{in}(9)$ |
| $W_{in}(10)$ | $W_{in}(11)$ | $W_{in}(12)$ | $W_{in}(13)$ | $W_{in}(14)$ |
| $W_{in}(15)$ | $W_{in}(16)$ | $W_{in}(17)$ | $W_{in}(18)$ | $W_{in}(19)$ |
| $W_{in}(20)$ | $W_{in}(21)$ | $W_{in}(22)$ | $W_{in}(23)$ | $W_{in}(24)$ |

=

| 0.077 | 0.01 | 0.121 | 0.01 | 0.077 |
|---|---|---|---|---|
| 0.01 | 0.01 | 0.01 | 0.01 | 0.01 |
| 0.121 | 0.01 | 0.192 | 0.01 | 0.121 |
| 0.01 | 0.01 | 0.01 | 0.01 | 0.01 |
| 0.077 | 0.01 | 0.121 | 0.01 | 0.077 |

EXAMPLE 1: WEIGHTING FACTORS $W_{in}$ IN IN-FOCUS REGION

| $W_{in}(0)$ | $W_{in}(1)$ | $W_{in}(2)$ | $W_{in}(3)$ | $W_{in}(4)$ |
|---|---|---|---|---|
| $W_{in}(5)$ | $W_{in}(6)$ | $W_{in}(7)$ | $W_{in}(8)$ | $W_{in}(9)$ |
| $W_{in}(10)$ | $W_{in}(11)$ | $W_{in}(12)$ | $W_{in}(13)$ | $W_{in}(14)$ |
| $W_{in}(15)$ | $W_{in}(16)$ | $W_{in}(17)$ | $W_{in}(18)$ | $W_{in}(19)$ |
| $W_{in}(20)$ | $W_{in}(21)$ | $W_{in}(22)$ | $W_{in}(23)$ | $W_{in}(24)$ |

=

| 0.078 | 0.01 | 0.123 | 0 | 0.078 |
|---|---|---|---|---|
| 0 | 0 | 0 | 0.01 | 0 |
| 0.123 | 0 | 0.192 | 0 | 0.123 |
| 0 | 0.01 | 0 | 0 | 0 |
| 0.078 | 0 | 0.123 | 0.01 | 0.078 |

EXAMPLE 2: WEIGHTING FACTORS $W_{in}$ IN IN-FOCUS REGION

FIG.14B

| $W_{in}(0)$ | $W_{in}(1)$ | $W_{in}(2)$ | $W_{in}(3)$ | $W_{in}(4)$ |
|---|---|---|---|---|
| $W_{in}(5)$ | $W_{in}(6)$ | $W_{in}(7)$ | $W_{in}(8)$ | $W_{in}(9)$ |
| $W_{in}(10)$ | $W_{in}(11)$ | $W_{in}(12)$ | $W_{in}(13)$ | $W_{in}(14)$ |
| $W_{in}(15)$ | $W_{in}(16)$ | $W_{in}(17)$ | $W_{in}(18)$ | $W_{in}(19)$ |
| $W_{in}(20)$ | $W_{in}(21)$ | $W_{in}(22)$ | $W_{in}(23)$ | $W_{in}(24)$ |

=

| 0.078 | 0.01 | 0.123 | 0 | 0.078 |
|---|---|---|---|---|
| 0 | 0 | 0 | 0.01 | 0 |
| 0.123 | 0 | 0.192 | 0 | 0.123 |
| 0 | 0.01 | 0 | 0 | 0 |
| 0.078 | 0 | 0.123 | 0.01 | 0.078 |

WEIGHTING FACTORS $W_{in}$ IN IN-FOCUS REGION

FIG.14C

| $W_{in}(0)$ | $W_{in}(1)$ | $W_{in}(2)$ | $W_{in}(3)$ | $W_{in}(4)$ |
|---|---|---|---|---|
| $W_{in}(5)$ | $W_{in}(6)$ | $W_{in}(7)$ | $W_{in}(8)$ | $W_{in}(9)$ |
| $W_{in}(10)$ | $W_{in}(11)$ | $W_{in}(12)$ | $W_{in}(13)$ | $W_{in}(14)$ |
| $W_{in}(15)$ | $W_{in}(16)$ | $W_{in}(17)$ | $W_{in}(18)$ | $W_{in}(19)$ |
| $W_{in}(20)$ | $W_{in}(21)$ | $W_{in}(22)$ | $W_{in}(23)$ | $W_{in}(24)$ |

=

| 1/9 | 0 | 1/9 | 0 | 1/9 |
|---|---|---|---|---|
| 0 | 0 | 0 | 0 | 0 |
| 1/9 | 0 | 1/9 | 0 | 1/9 |
| 0 | 0 | 0 | 0 | 0 |
| 1/9 | 0 | 1/9 | 0 | 1/9 |

WEIGHTING FACTORS $W_{in}$ IN IN-FOCUS REGION

IMAGE PROCESSING APPARATUS, IMAGE PROCESSING METHOD, AND PROGRAM

BACKGROUND OF THE INVENTION

1. Field of the Invention

The present invention relates to a technology for generating a synthesized image based on images captured from a plurality of viewpoints.

2. Description of the Related Art

Techniques for generating an image having a shallow depth of field by applying image processing to captured image data have been discussed heretofore. Japanese Patent Application Laid-Open No. 2011-10194 discusses generating an image having a shallow depth of field by blurring a background region of a scene by filter processing. WO 08/050,904 and Uncalibrated Synthetic Aperture for Defocus Control, Computer Vision and Pattern Recognition, 2009. CVPR 2009. IEEE Conference on Date: 20-25 Jun. 2009 (Patent Document 2) discusses deforming a plurality of images having different viewpoints (imaging positions) according to a viewpoint and an object distance for focusing. The deformed images are synthesized to generate a synthesized image having a shallower depth of field.

Japanese Patent Application No. 2008-541051 has a problem that an artifact occurs in a boundary between an object and a background in a case where the background is strongly blurred. According to Patent Document 2, a background can be strongly blurred to generate an image having a shallow depth of field, whereas the blurred region outside the depth of field (blurred region outside a region in focus) degrades image quality. According to Uncalibrated Synthetic Aperture for Defocus Control, Computer Vision and Pattern Recognition, 2009. CVPR 2009. IEEE Conference on Date: 20-25 Jun. 2009, intermediate viewpoint images are generated between captured images by estimation processing so that the image quality is improved in a blurred region outside the depth of field. The generation of such intermediate viewpoint images, however, has a problem that the region within the depth of field (region in focus) is also blurred. This problem stems from errors occurring during the generation of intermediate viewpoint images and errors when position adjustment is carried out before synthesizing the intermediate viewpoint images and the like.

SUMMARY OF THE INVENTION

The present invention is directed to suppressing a blur in a region in focus and improving image quality of a blurred region outside the in-focus region when generating a synthesized image based on image data captured from a plurality of viewpoints.

According to an aspect of the present invention, an image processing apparatus includes: an image input unit configured to input image data captured from a plurality of viewpoints; an interpolation image generation unit configured to generate interpolation image data to be obtained in capturing an image from a viewpoint other than the plurality of viewpoints, based on the image data captured from the plurality of viewpoints; a setting unit configured to set weighting factors for the captured image data and the interpolation image data region by region based on in-focus state information indicating in-focus states of the respective regions; and a synthesis unit configured to synthesize the captured image data and the interpolation image data to generate synthesized image data based on the weighting factors, wherein a weighting factor for interpolation image data in an in-focus region is smaller than a weighting factor for interpolation image data in at least a part of a region other than the in focus region.

According to the present invention, a blur in an in-focus region is suppressed and image quality of a blurred region outside the in-focus region is improved when a synthesized image is generated based on image data captured from a plurality of viewpoints.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating a procedure for distance estimation according to the first exemplary embodiment.

FIG. 12 is a diagram illustrating an example of virtual diaphragm parameters and weighting factors according to the first exemplary embodiment.

FIGS. 14A, 14B, and 14C are diagrams illustrating examples of weighting factors according to the first exemplary embodiment.

DESCRIPTION OF THE EMBODIMENTS

Various exemplary embodiments, features, and aspects of the invention will be described in detail below with reference to the drawings.

Figure 2:
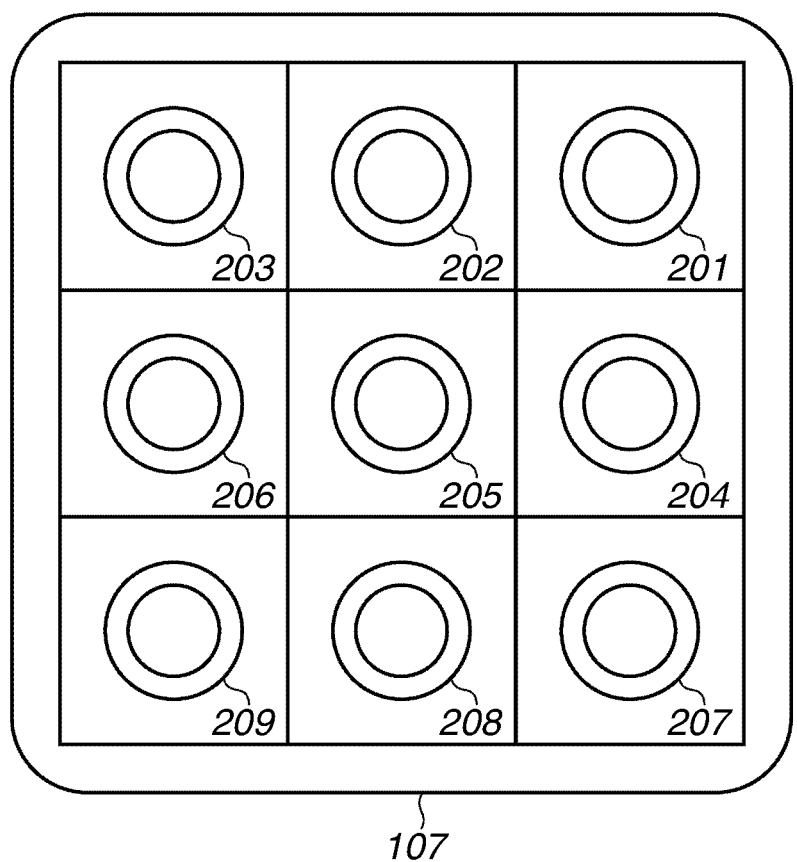
FIG. 2 is a diagram illustrating an imaging apparatus according to the first exemplary embodiment.

In the present first exemplary embodiment, an imaging apparatus 107 includes a plurality of camera units 201 to 209 as illustrated in FIG. 2. The imaging apparatus 107 captures a plurality of deep focus images, based on which interpolation images are generated so as to interpolate imaging positions. The deep focus images and the interpolation images are synthesized to generate a synthesized image having a shallow depth of field. An image includes a region to be put into focus (region in focus) and a region to be blurred (region out of focus). Synthesis processing is performed so that the interpolation images contribute less to a region in focus than to a region out of focus. In the present exemplary embodiment, the camera units 201 to 209 are arranged at regular intervals in a lattice configuration. The camera units 201 to 209 have a vertical axis, a horizontal axis, and an optical axis arranged in the same direction (or substantially the same direction). A synthesized image generated in the present exemplary embodiment is an image captured by the camera unit 205 and made shallow in the depth of field.

Figure 1:
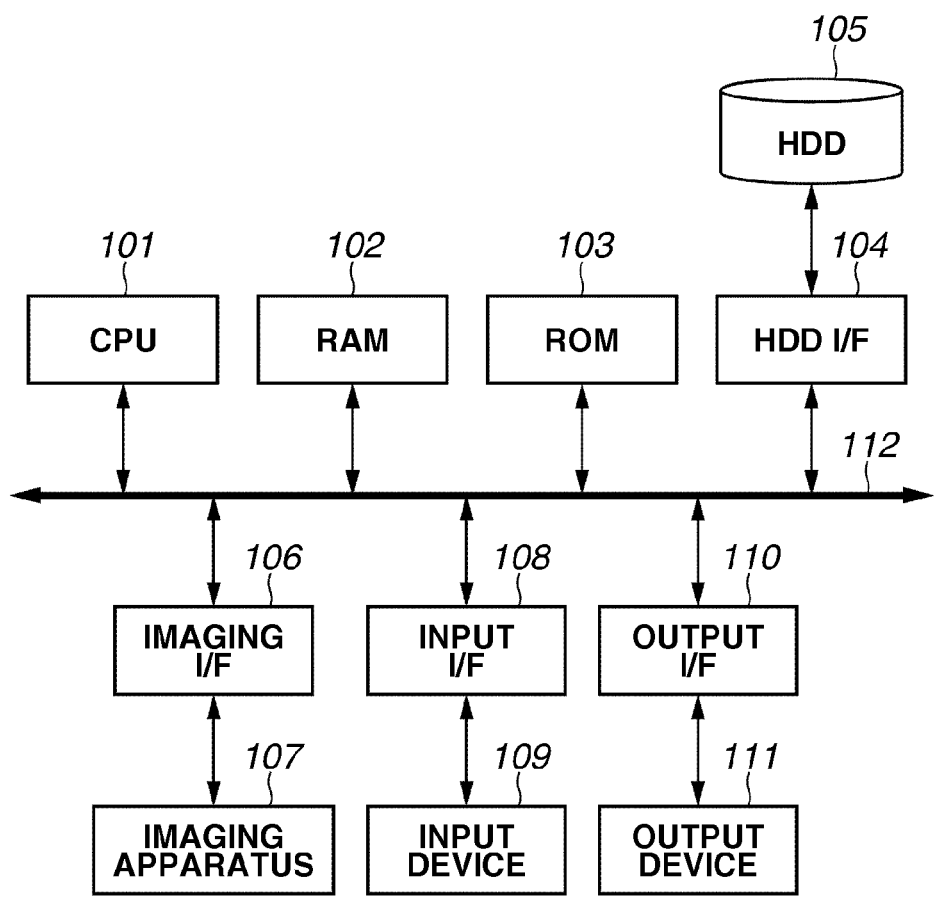
FIG. 1 is a block diagram illustrating the system configuration of an image processing apparatus according to a first exemplary embodiment.

Initially, an example of the system configuration of an image processing apparatus according to the present exemplary embodiment will be described with reference to FIG. 1. In FIG. 1, a central processing unit (CPU) 101 executes programs stored in a read-only memory (ROM) 103 and a hard disk drive (HDD) 105 using a random access memory (RAM) 102 as a work memory. The CPU 101 controls components described below through a system bus 112. As a result, various types of processing to be described later are performed.

An HDD interface (I/F) 104 connects to a secondary storage device such as the HDD 105 and an optical disk drive. Examples of the HDD I/F 104 include a serial advanced technology attachment (SATA) interface. The CPU 101 can read data from the HDD 105 and write data to the HDD 105 through the HDD I/F 104. The CPU 101 can load data stored in the HDD 105 into the RAM 102, and store data loaded in the RAM 102 into the HDD 105. The CPU 101 can execute data loaded in the RAM 102 as a program.

An imaging interface (I/F) 106 connects to the imaging apparatus 107 which includes a plurality of identical camera units 201 to 209 as illustrated in FIG. 2. Examples include a serial bus interface such as universal serial bus (USB) and the Institute of Electrical and Electronics Engineers (IEEE) 1394. The CPU 101 can control the imaging apparatus 107 through the imaging I/F 106 and perform image capturing. The CPU 101 can read captured data from the imaging apparatus 107 through the imaging I/F 106.

An input interface (I/F) 108 connects to an input device 109 such as a keyboard and a mouse. Examples of the input I/F 108 include a serial bus interface such as USB and IEEE 1394. The CPU 101 can read data from the input device 109 through the input I/F 108.

An output interface (I/F) 110 connects to an output device 111 such as an image display device. Examples of the input I/F 110 include a video output interface such as digital visual interface (DVI) and high-definition multimedia interface (HDMI). The CPU 101 can transmit data to the output device 111 through the output I/F 110 for display.

Figure 3:
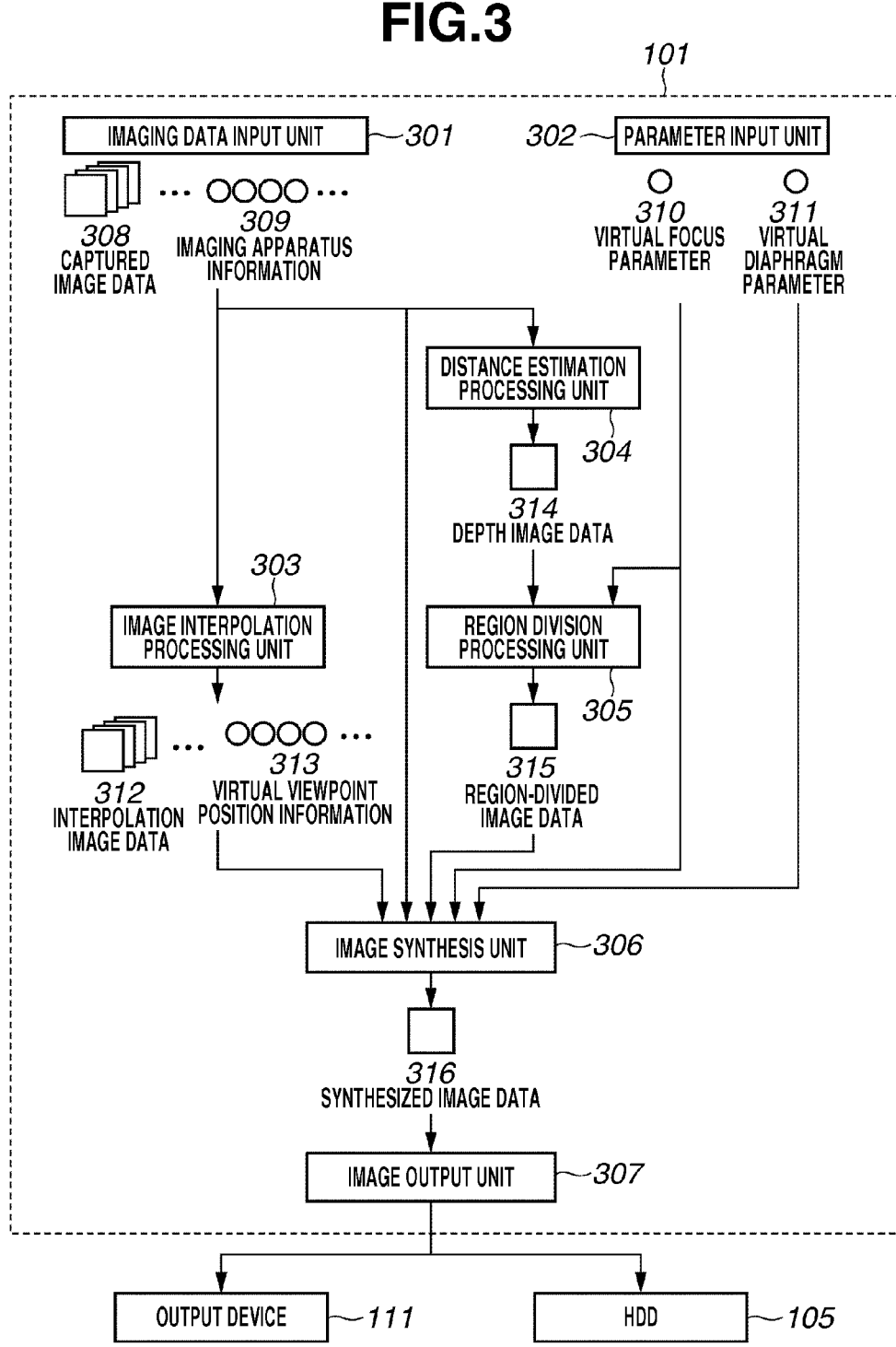
FIG. 3 is a diagram illustrating a functional configuration of the first exemplary embodiment.

Next, a functional configuration for performing a series of processing according to the present exemplary embodiment will be described with reference to FIG. 3. The CPU 101 includes an imaging data input unit 301, a parameter input unit 302, an image interpolation processing unit 303, a distance estimation processing unit 304, a region division processing unit 305, an image synthesis unit 306, and an image output unit 307 as its functional units. The imaging data input unit 301 serving as a functional unit of the CPU 101 acquires captured image data 308 and imaging apparatus information 309 from the imaging apparatus 107 or a storage device such as the ROM 103 and the HDD 105. The captured image data 308 includes plural pieces of image data that is captured by the imaging apparatus 107 from different viewpoint positions (imaging positions).

The imaging apparatus information 309 includes angles of view and imaging positions when the imaging apparatus 107 captures captured image data. The parameter input unit 302 serving as a functional unit of the CPU 101 acquires a virtual focus parameter (virtual focal length information) 310 from the input device 109 or a storage device such as the ROM 103 and the HDD 105. The virtual focus parameter 310 includes information on a distance (focal length) to a virtual focus plane. The parameter input unit 302 also acquires virtual diaphragm parameters (virtual diaphragm amount information) 311 from the input device 109. The virtual diaphragm parameters 311 include information on a virtual diaphragm amount. The parameter input unit 302 thus has a focal length input function of inputting focal length information which indicates a virtual focal length, and a diaphragm amount input function of inputting diaphragm amount information which indicates a virtual diaphragm amount.

The image interpolation processing unit 303 serving as a functional unit of the CPU 101 initially sets virtual viewpoint position information 313 based on the captured image data 308 and the imaging apparatus information 309 so as to interpolate imaging positions of the captured image data 308. Based on the captured image data 308, the image interpolation processing unit 303 then generates interpolation image data 312 to be obtained in a case where images are captured from virtual viewpoint positions specified by the pieces of virtual viewpoint position information 313.

The distance estimation processing unit 304 serving as a functional unit of the CPU 101 performs stereo matching to estimate a depth value of a captured scene region by region and generates depth image data 314 based on the captured image data 308 and the imaging apparatus information 309. The depth image data 314 is image data that includes depth information with respect to an object in each region (or at each pixel).

The region division processing unit 305 serving as a functional unit of the CPU 101 divides a captured scene between a region to be put into focus and a region to be blurred and generates region-divided image data 315 based on the virtual focus parameter 310 and the depth image data 314.

The image synthesis unit 306 serving as a functional unit of the CPU 101 acquires the imaging apparatus information 309, the virtual viewpoint position information 313, the virtual focus parameter 310, the virtual diaphragm parameters 311, and the region-divided image data 315. Based on such pieces of information, the image synthesis unit 306 synthesizes the captured image data 308 and the interpolation image data 312 to generate synthesized image data 316.

The image output unit 307 serving as a functional unit of the CPU 101 outputs the synthesized image data 316 to the output device 111 and/or stores the synthesized image data 316 into the HDD 105.

Figure 4:
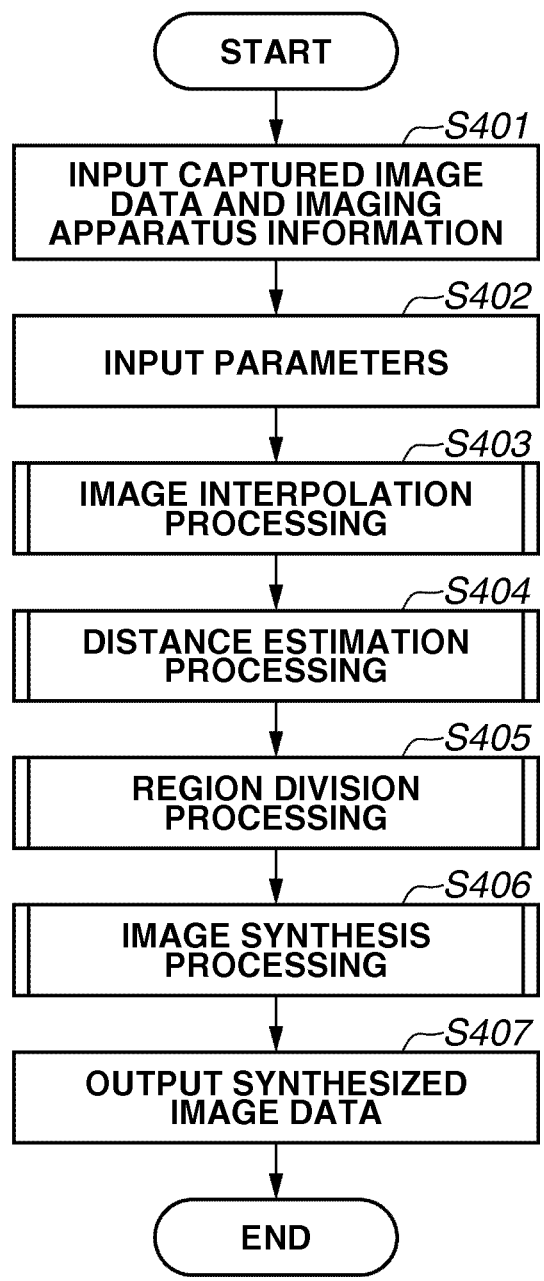
FIG. 4 is a flowchart illustrating a processing procedure according to the first exemplary embodiment.

FIG. 4 is a flowchart illustrating an operation procedure for a series of processing of the image processing apparatus according to the present exemplary embodiment. More specifically, the processing is implemented by the CPU 101 reading a computer-executable program describing the procedure illustrated in the flowchart of FIG. 4 from the ROM 103 or the HDD 105 into the RAM 102 and executing the program. The processing steps illustrated in FIG. 4 will be described below.

In step S401, the imaging data input unit 301 initially captures captured image data 308 by using the imaging apparatus 107. The image data input unit 301 acquires the captured image data 308 and imaging apparatus information 309 which includes the angles of view and the imaging positions of the camera units 201 to 209 in the imaging apparatus 107. Alternatively, captured image data 308 and imaging apparatus information 309 including the angles of view and the imaging positions of the camera units 201 to 209 in the imaging apparatus 107 may be retained in a recording device such as the ROM 103 and the HDD 105 in advance. The imaging data input unit 301 may acquire such captured image data 308 and imaging apparatus information 309.

In step S402, the parameter input unit 302 acquires a virtual focus parameter 310 and virtual diaphragm parameters 311 from the input device 109. The virtual focus parameter 310 includes a virtual focus distance (focal length). The virtual diaphragm parameters 311 include weighting factors for images to be used in image synthesis. Alternatively, a virtual focus parameter 310 and virtual diaphragm parameters 311 may be retained in a recording device such as the ROM 103 and the HDD 105 in advance. The parameter input unit 302 may acquire such a virtual focus parameter 310 and virtual diaphragm parameters 311.

In step S403, the image interpolation processing unit 303 sets virtual viewpoint position information 313 based on the captured image data 308 and the imaging apparatus information 309 acquired in step S401 so as to interpolate imaging positions of the captured image data 308. The virtual viewpoint position information 313 specifies positions other than the imaging positions (viewpoint positions). Using parallax interpolation processing, the image interpolation processing unit 303 generates interpolation image data 312 to be obtained from the viewpoints other than the viewpoint positions, specified by the respective pieces of virtual viewpoint position information 313, based on the captured image data 308. The image interpolation processing performed in step S403 will be described in detail later.

In step S404, the distance estimation processing unit 304 performs distance estimation processing based on the captured image data 308 and the imaging apparatus information 309 acquired in step S401. The distance estimation processing unit 304 thereby estimates the depth of a captured scene and generates depth image data 314 of the scene. The distance estimation processing performed in step S404 will be described in detail later.

In step S405, the region division processing unit 305 divides the scene between two regions and generates region-divided image data 315 based on the virtual focus parameter 310 acquired in step S402 and the depth image data 314 acquired in step S404. The two regions are a region to be put into focus (in-focus region, region in focus) and a region to be blurred (out-of-focus region). The region division processing performed in step S405 will be described in detail later.

In step S406, the image synthesis unit 306 synthesizes the captured image data 308 and the interpolation image data 312 to generate synthesized image data 316 based on the imaging apparatus information 309, the virtual diaphragm parameters 311, the virtual viewpoint position information 313, and the region-divided image data 315. The image synthesis processing performed in step S406 will be described in detail later.

In step S407, the image output unit 307 displays the synthesized image data 316 on the output device 111 and/or records the synthesized image data 316 into a recording device such as the HDD 105.

(Image Interpolation Processing)

Figure 5:
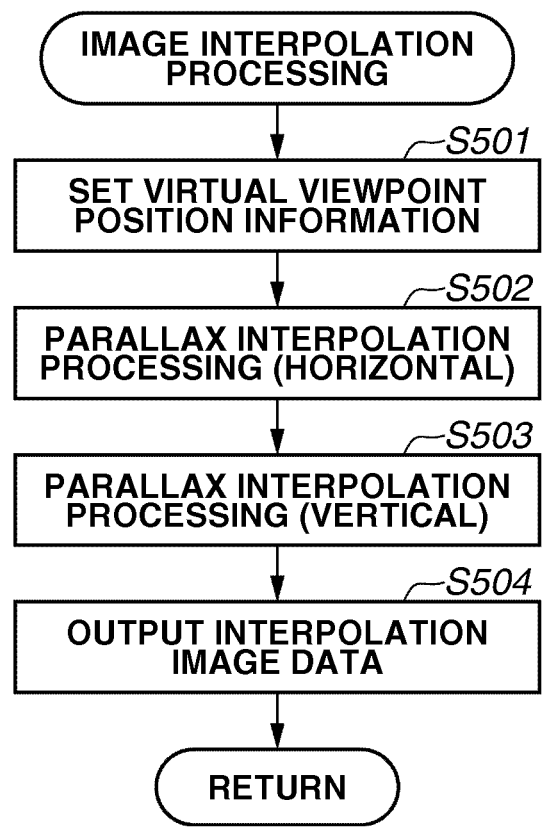
FIG. 5 is a flowchart illustrating a procedure for image interpolation processing according to the first exemplary embodiment.

The image interpolation processing performed in step S403 will be described. In the image interpolation processing, the image interpolation processing unit 303 sets virtual viewpoint position information 313 so as to interpolate imaging positions of the captured image data 308. The virtual viewpoint position information 313 specifies positions other than the imaging positions (viewpoint positions). Using parallax interpolation processing, the image interpolation processing unit 303 then generates interpolation image data 312 corresponding to the positions specified by the respective pieces of virtual viewpoint position information 313 (positions other than viewpoints) based on the captured image data 308. The image interpolation processing will be described in detail below with reference to the flowchart illustrated in FIG. 5.

Figure 6A:
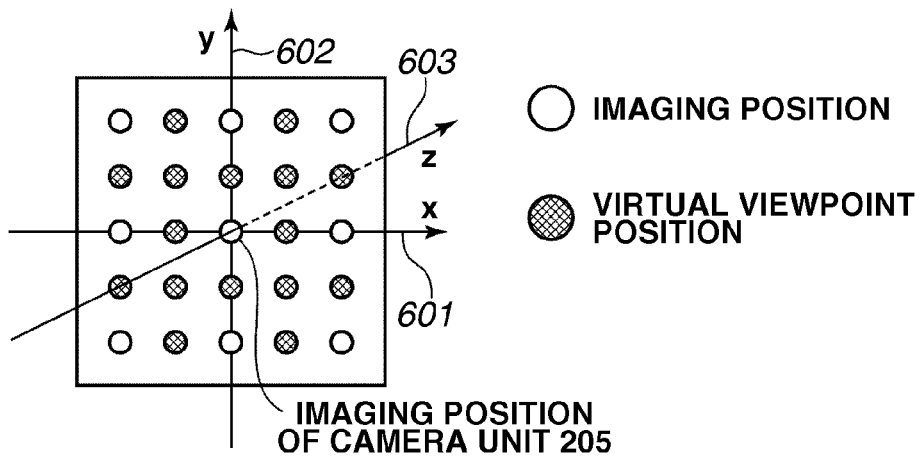
FIGS. 6A, 6B, and 6C are diagrams illustrating a relationship between imaging positions and virtual viewpoint positions according to the first exemplary embodiment.

In step S501, the image interpolation processing unit 303 initially sets virtual viewpoint position information 313 which specifies virtual viewpoint positions for generating interpolation image data 312. FIG. 6A illustrates a relationship between imaging positions and virtual viewpoint positions. An x-axis 601, a y-axis 602, and a z-axis 603 correspond to the horizontal direction, vertical direction, and optical axis direction of the camera units 201 to 209, respectively. The x-axis 601, y-axis 602, and z-axis 603 are orthogonal to each other with the imaging position of the camera unit 205 as an origin point. Virtual viewpoint positions are set to interpolate imaging positions. In the present exemplary embodiment, as illustrated in FIG. 6A, virtual viewpoint positions are arranged in a lattice configuration so as to interpolate imaging positions at regular intervals.

Figure 6B:
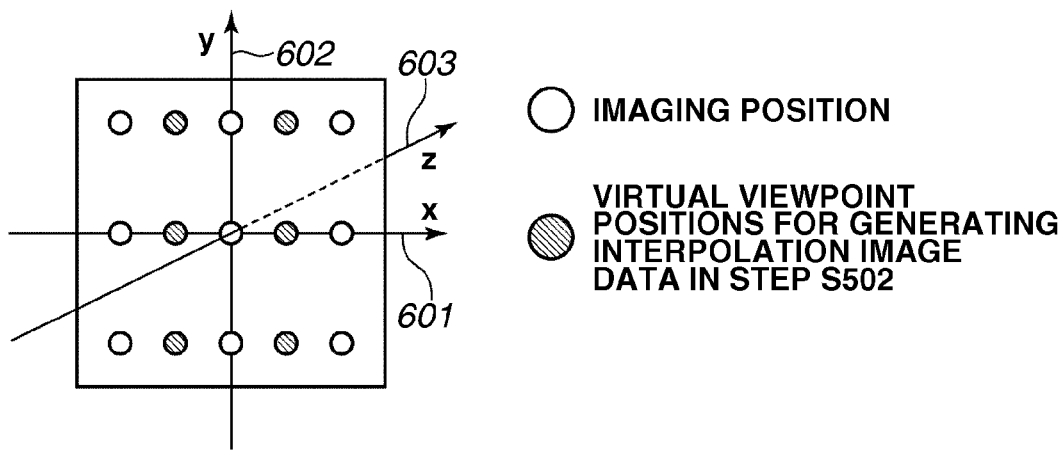

In step S502, the image interpolation processing unit 303 selects two images having horizontally adjoining imaging positions, from the captured image data 308 in succession. Using parallax interpolation processing, the image interpolation processing unit 303 generates interpolation image data 312 corresponding to a virtual viewpoint position specified by virtual viewpoint information 313 between the two images. FIG. 6B illustrates virtual viewpoint positions for generating interpolation image data 312 in step S502. The parallax interpolation processing may be performed by using an existing method. For example, the image interpolation processing unit 303 may generate interpolation image data 312 corresponding to virtual viewpoint positions specified by virtual viewpoint position information 313 based on the amount of parallax of each pixel calculated by block matching between the two images. Alternatively, the image interpolation processing unit 303 may generate interpolation image data 312 corresponding to virtual viewpoint positions by associating feature points extracted from the two images and performing morphing processing based on the correspondence between the feature points.

Figure 6C:
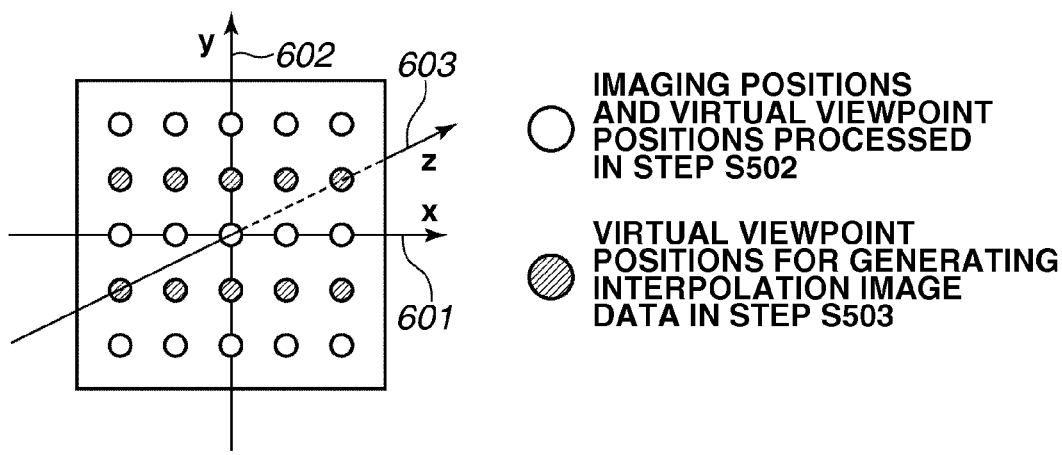

In step S503, the image interpolation processing unit 303 selects a pair of images having vertically adjoining imaging positions, from the captured image data 308 and the interpolation image data 312 generated in step S502. Using parallax interpolation processing, the image interpolation processing unit 303 generates interpolation image data 312 corresponding to virtual viewpoint information 313 between the two images. FIG. 6C illustrates virtual viewpoint positions for generating interpolation image data 312 in step S503. Techniques similar to those of step S502 may be applied to this parallax interpolation processing.

In step S504, the image interpolation processing unit 303 finally outputs the interpolation image data 312 generated in steps S502 and S503.

(Distance Estimation Processing)

Now, the distance estimation processing performed in step S404 will be described. In the distance estimation processing, the distance estimation processing unit 304 estimates the distance of a captured scene and generates depth image data 314 based on a plural pieces of captured image data 308 in different positions. For example, distance estimation methods such as a stereo method and a multi-baseline stereo method may be applied. In the present exemplary embodiment, the distance estimation processing unit 304 uses a stereo method for distance estimation. The distance estimation processing will be described in detail below with reference to the flowchart illustrated in FIG. 7.

In step S701, the distance estimation processing unit 304 initially selects two images to be used for processing from the captured image data 308. In the present exemplary embodiment, the distance estimation processing unit 304 selects an image that is captured by the central camera unit 205 of the imaging apparatus 107 and an image that is captured by the horizontally-adjoining camera unit 206. Hereinafter, the former will be referred to as a reference image, and the latter as an intended image.

In step S702, the distance estimation processing unit 304 initializes a target pixel to perform the following processing on.

In step S703, the distance estimation processing unit 304 determines whether distance values of all pixels have been determined. If the distance values of all the pixels have been determined (YES in step S703), the distance estimation processing unit 304 proceeds to step S707. If there is any pixel whose distance value has not been determined (NO in step S703), the distance estimation processing unit 304 proceeds to step S704.

In step S704, the distance estimation processing unit 304 initially selects a region that includes a target pixel (i,j) and surrounding pixels of the reference image. Using the selected region, the distance estimation processing unit 304 performs pattern matching with the intended image to determine a pixel of the target image corresponding to the target pixel (corresponding pixel), from the intended image.

Figure 8:
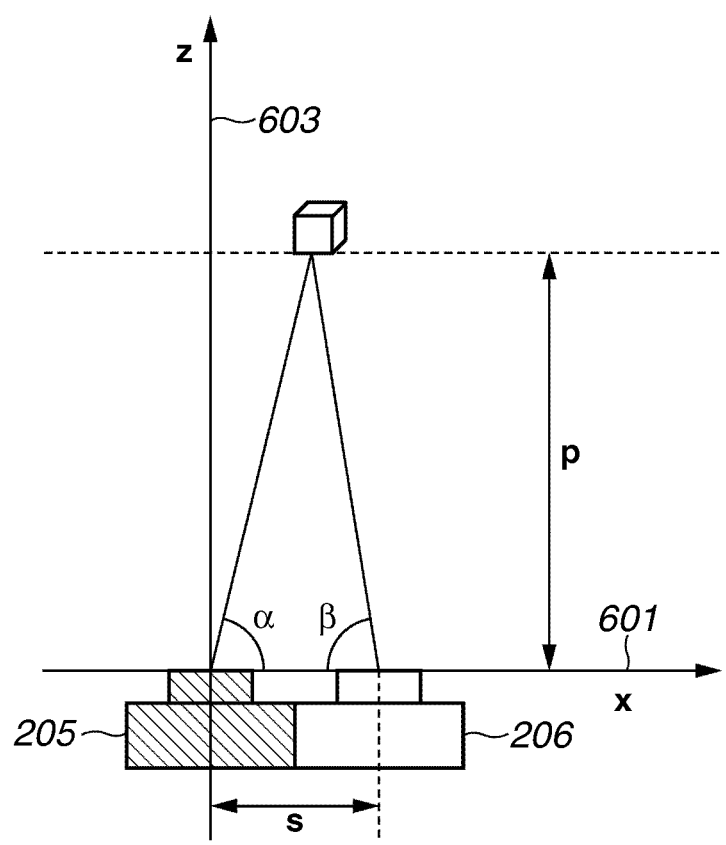
FIG. 8 is a diagram illustrating a relationship between the interval of imaging positions and a distance to an object according to the first exemplary embodiment.

In step S705, the distance estimation processing unit 304 determines a distance value D(i,j) to an object corresponding to the target pixel, based on the imaging apparatus information 309, the target pixel (i,j), and the corresponding pixel determined in step S704. Using α, β, and s illustrated in FIG. 8, the distance value D is expressed by the following equation (1):

$$D(i, j) = \frac{\sin\alpha \sin\beta}{\sin(\Pi - \alpha - \beta)}, \quad (1)$$

where α is calculated from the horizontal angle of view of the camera unit 205, the imaging position of the reference image, and the coordinates of the target pixel. β is calculated from the horizontal angle of view of the camera unit 206, the imaging position of the target image, and the coordinates of the corresponding pixel. s is the distance between the camera units 205 and 206. s is calculated from the imaging positions of the reference image and the intended image.

In step S706, the distance estimation processing unit 304 updates the target pixel, and returns to step S703.

In step S707, the distance estimation processing unit 304 finally outputs depth image data 314. The depth image data 314 includes the distance values of the reference image as respective pixel values.

In the present exemplary embodiment, in step S701, the distance estimation processing unit 304 selects the camera units 205 and 206 for distance estimation. However, a combination of camera units capable of distance estimation is not limited thereto. For example, images of other camera units may be selected as an intended image. The greater the distance s between camera units, the higher the accuracy of the distance estimation processing. In the present exemplary embodiment, depth image data 314 is image data that includes distance information with respect to an object pixel by pixel. However, depth image data 314 may be image data that includes distance information on each region including a plurality of pixels.

(Region Division Processing)

Figure 9:
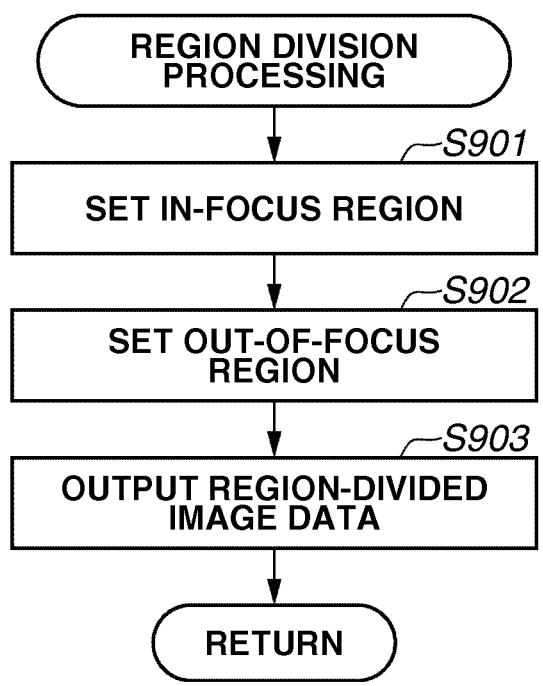
FIG. 9 is a flowchart illustrating a procedure for region division processing according to the first exemplary embodiment.

The region division processing performed in step S405 will be described. In the region division processing, the region division processing unit 305 divides a scene between a region to be put into focus and another region, and generates region-divided image data 315 based on the virtual focus parameter 310 acquired in step S402 and the depth image data 314 generated in step S404. The region division processing will be described in detail below with reference to the flowchart illustrated in FIG. 9.

In step S901, the region division processing unit 305 sets an in-focus region. The region division processing unit 305 sets the in-focus region to include a set of pixels (i,j) where D(i,j)=d. Here, d is a virtual focus distance obtained from the virtual focus parameter 310. D(i,j) represents pixel values of the depth image data 314.

In step S902, the region division processing unit 305 sets an out-of-focus region. The region division processing unit 305 sets the out-of-focus region to include a set of pixels of the depth image data 314 other than those of the in-focus region. In other words, an in-focus region corresponds to a region where an object is in focus. An out-of-focus region corresponds to a region other than the region where an object is in focus.

In step S903, the region division processing unit 305 assigns different label values to the in-focus region and the out-of-focus region, respectively, and outputs the resulting image as region-divided image data 315. Such region-divided image data 315 has in-focus state information that indicates the focus (in-focus) state of each pixel.

Figure 10:
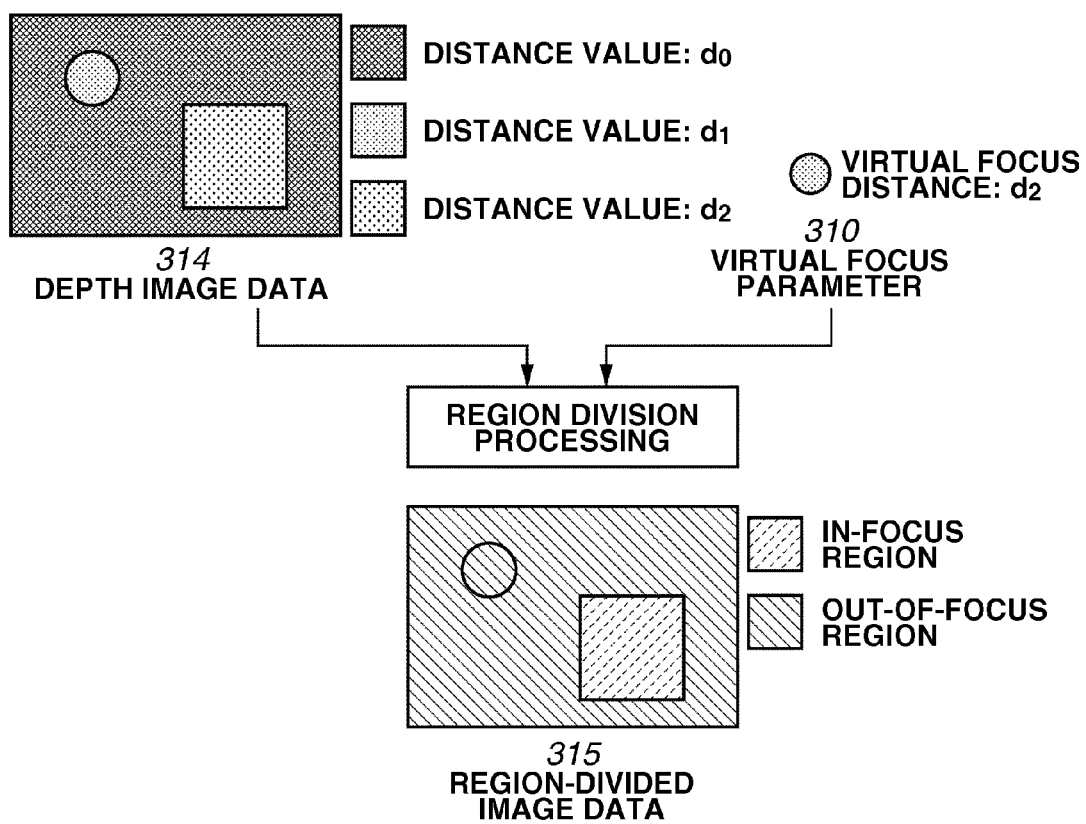
FIG. 10 is a diagram illustrating region-divided image data according to the first exemplary embodiment.

FIG. 10 illustrates an example of the region-divided image data 315 obtained by the foregoing processing. Suppose that depth image data 314 is an image including distance values $d_0$, $d_1$, and $d_2$, and the virtual focus distance obtained from the virtual focus parameter 310 is $d_2$. In such a case, a set of pixels having a depth value of $d_2$ in the depth image data 314 constitutes an in-focus region. A set of pixels having the other distance values $d_0$ and $d_1$ constitutes an out-of-focus region. In the present exemplary embodiment, region-divided image data 315 includes in-focus state information that indicates the focus (in-focus) state of each pixel. However, region-divided image data 315 may include in-focus state information that indicates the focus (in-focus) state of each region including a plurality of pixels.

According to the present exemplary embodiment, in step S901, a region where pixel values D(i,j) of depth image data 314 are equal to the virtual focus distance d is set as an in-focus region. However, the method of setting an in-focus region is not limited thereto. For example, an in-focus region may be set to include pixels (i,j) that satisfy $d-\alpha_1 \leq D(i,j) \leq d+\alpha_2$. The values of $\alpha_1$ and $\alpha_2$ may be determined based on virtual depth-of-field information on synthesized image data 316. For example, the values of $\alpha_1$ and $\alpha_2$ may be increased in a case where synthesized image data 316 has a great depth of field. The values of $\alpha_1$ and $\alpha_2$ may be decreased in a case where synthesized image data 316 has a shallow depth of field. The user may input $\alpha_1$ and $\alpha_2$ through the input device 109. $\alpha_1$ and $\alpha_2$ may be retained in the ROM 103 or the HDD 105 and input to the CPU 101 at the time of the region division processing. In such a case, a not-illustrated field-of-depth input unit controls the input. A virtual depth of field of synthesized image data 316 can be determined from the virtual diaphragm parameters 311. If coefficients of the virtual diaphragm parameters 311 are determined according to a Gaussian function, the depth can be determined from the value of a standard deviation that defines the Gaussian function. The smaller the standard deviation, the greater the depth. The greater the standard deviation, the shallower the depth.

(Image Synthesis Processing)

Figure 11:
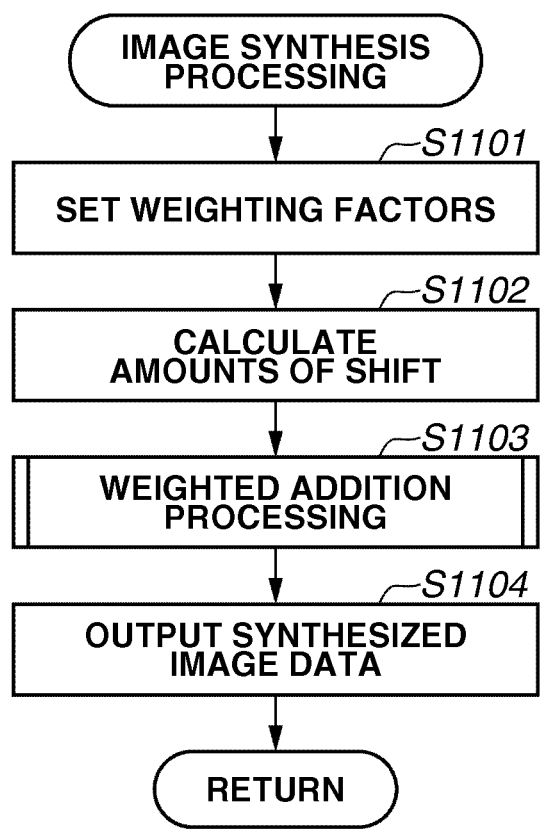
FIG. 11 is a flowchart illustrating a procedure for image synthesis processing according to the fifth exemplary embodiment.

The image synthesis processing performed in step S406 will be described. In the image synthesis processing, the image synthesis processing unit 306 initially sets weighting factors for respective images in both an in-focus region and an out-of-focus region based on the virtual diaphragm parameters 311. The image synthesis processing unit 306 then shifts the images and performs weighted additions by using different weighting factors in respective regions to generate synthesized image data 316 based on the imaging apparatus information 309 and the virtual viewpoint position information 313. The image synthesis processing will be described in detail below with reference to the flowchart illustrated in FIG. 11.

In step S1101, the image synthesis processing unit 306 sets two weighting factors for use in image synthesis based on the virtual diaphragm parameters 311 acquired in step S402. Referring to FIG. 12, virtual diaphragm parameters 311 and weighting factors corresponding to an in-focus region and an out-of-focus region will initially be described. Virtual diaphragm parameters 311 are a set of coefficients for captured image data 308 and interpolation image data 312.

Assume that $P_m$ represents both an imaging position and apiece of virtual viewpoint position information 313. A piece of captured image data 308 or interpolation image data 312 corresponding to $P_m$ is referred to as an image $I_m$. A(m) is the value of a virtual diaphragm parameter 311 corresponding to $I_m$. $W_{in}(m)$ and $W_{out}(m)$ are the values of weighting factors in an in-focus region and an out-of-focus region, respectively. FIG. 12 illustrates the relationship between $P_m$, A(m), $W_{in}(m)$, and $W_{out}(m)$ according to the present exemplary embodiment. Here, the values of A(m) are normalized and set such that a total sum becomes 1 according to a Gaussian function with $P_{12}$ at the center. Setting A(m) according to a Gaussian function enables smooth blurring of an out-of-focus region when synthesized. $W_{in}(m)$ and $W_{out}(m)$ are set based on A(m) by using the following equations (2) and (3):

$$w_{in}(m) = \begin{cases} \dfrac{A(m)}{k}, & \text{if image } I_m \text{ is a captured image,} \\ 0, & \text{if image } I_m \text{ is an interpolation image,} \end{cases} \quad (2)$$

$$w_{out}(m) = A(m), \quad (3)$$

where k is the sum of coefficients corresponding to captured images with A(m), whereby $W_{in}(m)$ are normalized such that its sum becomes 1. In the present exemplary embodiment, weighting factors corresponding to interpolation image data 312 in an in-focus region are set to 0 so as to preclude contribution of the interpolation image data 312. In an out-of-focus region, the values of the virtual diaphragm parameters 311 are used as it is.

In step S1102, the image synthesis processing unit 306 calculates the amounts of shift of the respective captured images based on the imaging apparatus information 309 and the virtual viewpoint position information 313. With a focus distance of d, the amount of horizontal shift $\Delta i(m,d)$ and the amount of vertical shift $\Delta j(m,d)$ of an image $I_m$ are given by the following equations (4) and (5):

$$\Delta i(m, d) = \frac{(s_m - s')W}{2d\tan(\theta_w/2)}, \quad (4)$$

$$\Delta j(m, d) = \frac{(t_m - t')H}{2d\tan(\theta_h/2)}, \quad (5)$$

where W and H are the horizontal and vertical image sizes of the image $I_m$, respectively. $\theta_w$ is the horizontal angle of view of a camera unit. $\theta_h$ is the vertical angle of view of a camera unit. $(s_m, t_m)$ are the coordinates of $P_m$ in an xy plane. (s',t') are the coordinates of the imaging position $P_{12}$ of the camera unit 205 in the xy plane.

Figure 13:
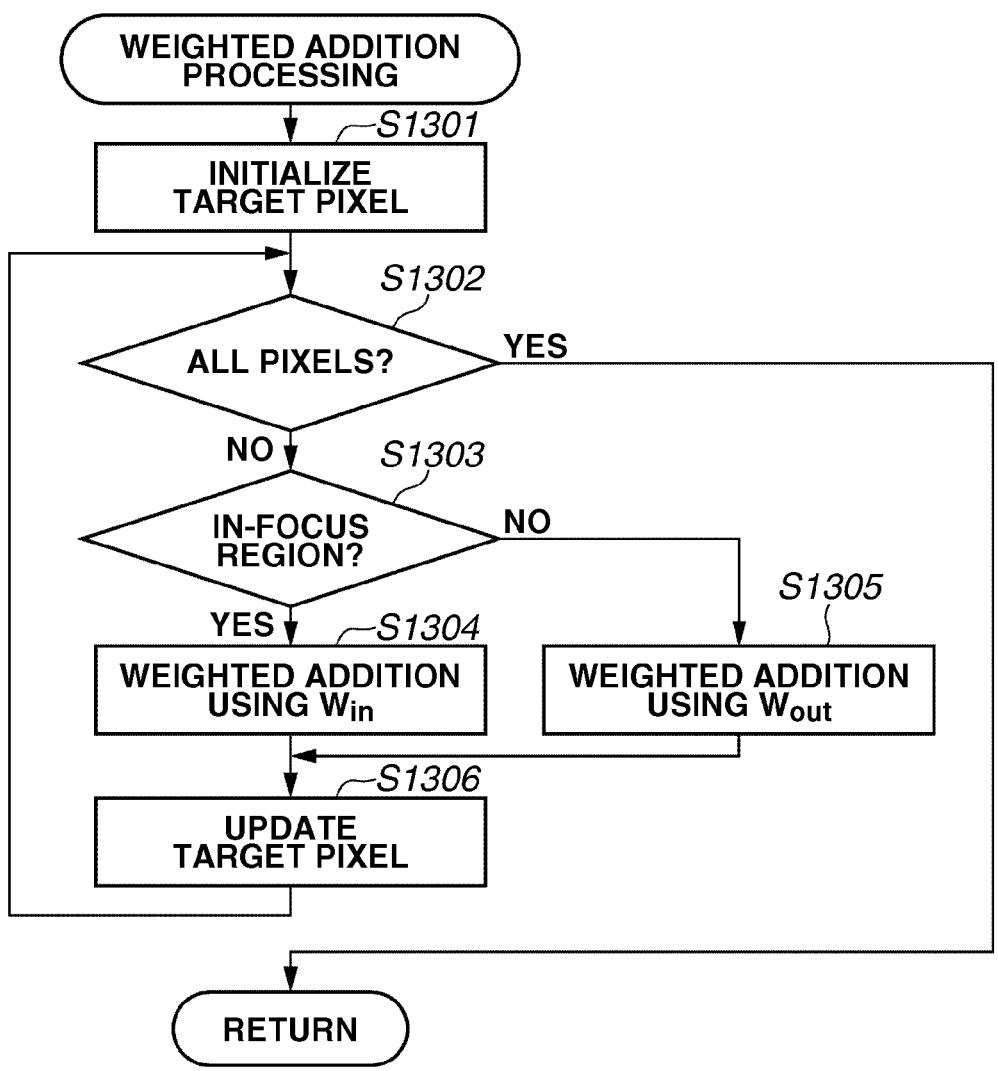
FIG. 13 is a flowchart illustrating a procedure for weighted addition according to the first exemplary embodiment.

In step S1103, the image synthesis processing unit 306 performs weighted addition processing on the captured image data 308 and the interpolation image data 312 by using the amounts of shift determined in step S1102, the weighting factors determined in step S1101, and the region-divided image data 315. The image synthesis processing unit 306 thereby generates synthesized image data 316. FIG. 13 is a flowchart illustrating the weighted addition processing.

In step S1301, the image synthesis processing unit 306 first initializes a target pixel (i,j). In step S1302, the image synthesis processing unit 306 determines whether the weighted addition processing has been performed on all pixels. If there is any unprocessed pixel (NO in step S1302), the image synthesis processing unit 306 proceeds to step S1303. If all the pixels have been processed (YES in step S1302), the image synthesis processing unit 306 ends the weighted addition processing.

In step S1303, the image synthesis processing unit 306 refers to the region-divided image data 315 and determines whether the target pixel is included in an in-focus region. If the target pixel is included in the in-focus region (YES in step S1303), the image synthesis processing unit 306 proceeds to step S1304. If the target pixel is included in an out-of-focus region (NO in step S1303), the image synthesis processing unit 306 proceeds to step S1305. In step S1304, the image synthesis processing unit 306 performs a weighted addition by using a weighting factor $W_{in}$. Synthesized image data 316 will be denoted by H. The image synthesis processing is expressed by the following equation (6):

$$H(i, j) = \sum_m w_{in}(m) I_m(i + \Delta i(m, d), j + \Delta j(m, d)) \quad (6)$$

Equation (6) means that synthesized image data 316 is obtained by multiplying pieces of captured image data or interpolation image data $I_m$ by respectively set weighting factors $W_{in}$, shifting the pieces of image data $I_m$ based on the amounts of shift $\Delta i$ and $\Delta j$, and adding up the resultant.

In step S1305, the image synthesis processing unit 306 performs a weighted addition by using a weighting factor $W_{out}$. With synthesized image data 316 denoted by H, the image synthesis processing is expressed by the following equation (7):

$$H(i, j) = \sum_m w_{out}(m) I_m(i + \Delta i(m, d), j + \Delta j(m, d)) \quad (7)$$

Equation (7) means that synthesized image data 316 is obtained by multiplying pieces of captured image data or interpolation image data $I_m$ by respectively set weighting factors $W_{out}$, shifting the pieces of image data $I_m$ based on the amounts of shift $\Delta i$ and $\Delta j$, and adding up the resultant.

In step S1306, the image synthesis processing unit 306 updates the target pixel (i,j), and returns to step S1302.

In step S1104, the image synthesis processing unit 306 finally outputs the generated synthesized image data 316.

According to the present exemplary embodiment, in step S1101, the values of weighting factors $W_{in}$ corresponding to interpolation image data 312 in an in-focus region are set to zero so as to preclude the contribution of the interpolation image data 312. However, the method of setting weighting factors $W_{in}$ in an in-focus region is not limited thereto. For example, weighting factors $W_{in}$ may be set to be a value near zero so that the contribution of the interpolation image data 312 is sufficiently small. Alternatively, weighting factors $W_{out}$ in an out-of-focus region may be determined such that the sum of weighting factors $W_{out}$ for interpolation image data 312 in the out-of-focus region becomes greater than the sum of weighting factors $W_{in}$ for interpolation image data 312 in an in-focus region. FIG. 14A illustrates specific examples of weighting factors $W_{in}$. In the present exemplary embodiment, the contribution of interpolation image data 312 in an in-focus region can thus be reduced to suppress a blur arising from synthesis in the in-focus region (region within the depth of field).

As described above, according to the present exemplary embodiment, it is possible to suppress a blur in an in-focus region (region within the depth of field) and improve the image quality of a blurred region outside the depth of field when generating a synthesized image based on image data 308 captured from a plurality of viewpoints.

According to the present exemplary embodiment, the region-divided image data 315 is image data to which label values indicating an in-focus region and an out-of-focus region are assigned. However, the present exemplary embodiment is not limited thereto and may be modified without departing from the gist thereof. More specifically, weighting factors $W_{in}$ for interpolation image data 312 in an in-focus region only need to be smaller than weighting factors $W_{out}$ in at least a part of an out-of-focus region. This can suppress a blur in the in-focus region caused by synthesis, and produce a blur of high image quality in at least a part of the out-of-focus region.

Example Modifications

The present exemplary embodiment has dealt with the case where depth image data 314 is generated by the distance estimation processing in step S404. However, the method of generating depth image data 314 is not limited thereto. For example, a scene depth may be measured by using an external sensor, and depth image data 314 may be generated based on the measurement. The imaging apparatus 107 may include an additional range sensor, and depth image data 314 may be generated based on the range sensor.

The present exemplary embodiment has dealt with the case where the image synthesis processing unit 306 performs the image synthesis processing on a plurality of pieces of image data in an in-focus region based on the weighting factors $W_{in}$ illustrated in FIG. 12 or 14A, for example. However, the image synthesis processing may be omitted in an in-focus region. For example, image data of an image $I_{15}$ alone may be used instead. FIG. 14B illustrates weighting factors $W_{in}$ in such a case. Even in such a case, the image synthesis processing unit 306 performs image synthesis processing on an out-of-focus region based on the weighting factors $W_{out}$ illustrated in FIG. 12, for example.

The present exemplary embodiment has dealt with the case where the imaging apparatus 107 captures deep focus images. However, the invention is not limited thereto. For example, images having a shallow depth of field may be used for image synthesis processing.

The present exemplary embodiment has dealt with the case where weighting factors $W_{in}$ in an in-focus region are set such that higher weights are given to captured images whose imaging positions are closer to the imaging position $P_{12}$. However, weighting factors $W_{in}$ may be set so that equal weights are given to captured images regardless of imaging positions. FIG. 14C illustrates weighting factors $W_{in}$ in such a case. Even in such a case, the image synthesis processing unit 306 performs image synthesis processing on an out-of-focus region based on the weighting factors $W_{out}$ illustrated in FIG. 12, for example. With such weighting factors $W_{in}$, the signal-to-noise (S/N) ratio of the in-focus region improves as compared to other weighting factors.

In the first exemplary embodiment, a scene is divided between two regions, that is, an in-focus region and an out-of-focus region. In a second exemplary embodiment, an intermediate region will be provided in the boundary between the two regions. A scene is thereby divided into three regions so that an in-focus region and an out-of-focus region are connected with a smooth boundary.

The second exemplary embodiment differs from the first exemplary embodiment in the region division processing performed in step S405 and the image synthesis processing performed in step S406. The region division processing and image synthesis processing will be described in detail below. Description will be omitted about other respects which are common to the first exemplary embodiment.

(Region Division Processing)

Figure 15:
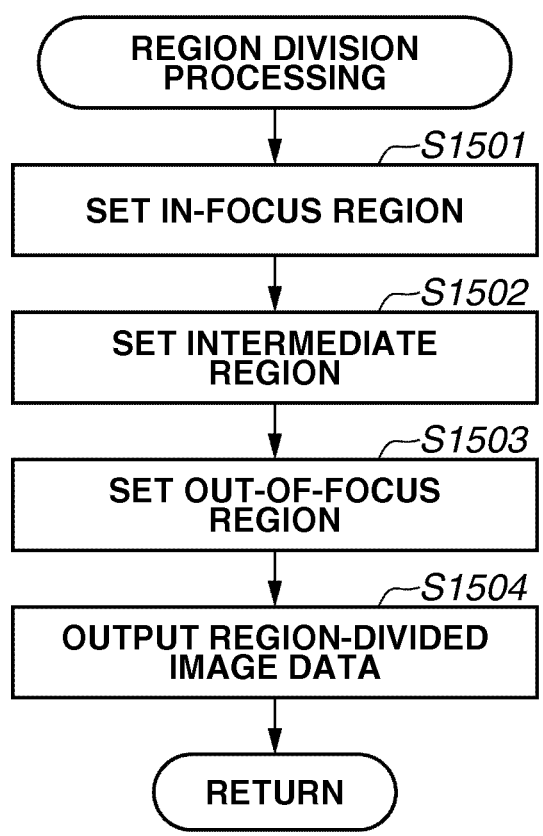
FIG. 15 is a flowchart illustrating a procedure for region division processing according to a second exemplary embodiment.

The region division processing will be described in detail with reference to the flowchart illustrated in FIG. 15.

In step S1501, the region division processing unit 305 initially sets an in-focus region. The region division processing unit 305 may perform the same processing as that of step S901.

In step S1502, the region division processing unit 305 sets an intermediate region. Based on the in-focus region obtained in step S1501, the region division processing unit 305 sets the periphery of the in-focus region as an intermediate region. In the present exemplary embodiment, a set of pixels lying within a distance of r from the in-focus region is the intermediate region.

In step S1503, the region division processing unit 305 sets an out-of-focus region. The region division processing unit 305 sets a set of pixels of the depth image data 314 other than those in the in-focus region and the intermediate region to be the out-of-focus region.

In step S1504, the region division processing unit 305 assigns different label values to the in-focus region, the out-of-focus region, and the intermediate region, respectively, and outputs the resulting image as region-divided image data 315.

Figure 16:
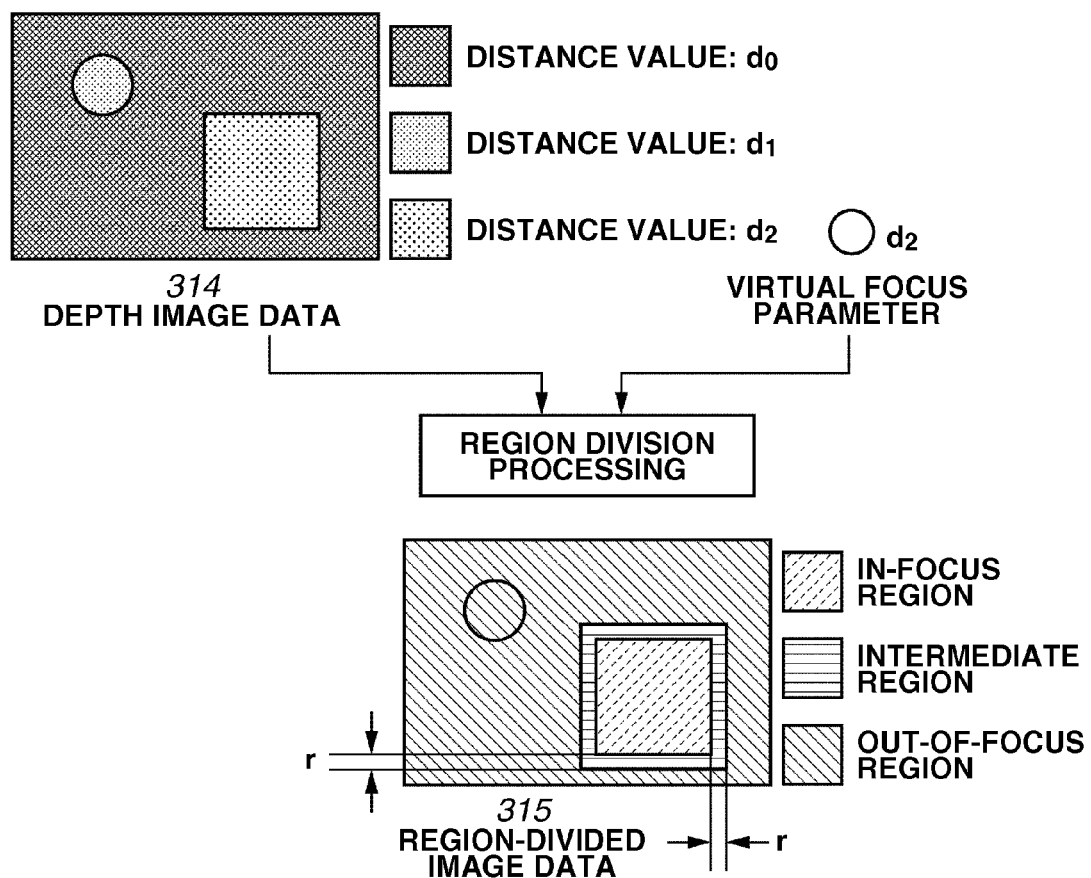
FIG. 16 is a diagram illustrating region-divided image data according to the second exemplary embodiment.

FIG. 16 illustrates an example of the region-divided image data 315 obtained by the foregoing processing. Suppose that depth image data 314 is an image including distance values $d_0$, $d_1$, and $d_2$, and a virtual focus distance obtained from the virtual focus parameter 310 is $d_2$. In such a case, a set of pixels having a depth value of $d_2$ constitutes an in-focus region of the depth image data 314. A set of pixels lying within a distance of r from the in-focus region constitutes an intermediate region. A set of the remaining pixels constitutes an out-of-focus region.

According to the present exemplary embodiment, in step S1502, the region division processing unit 305 sets the intermediate region to include a set of pixels lying within a distance of r from the in-focus region. However, the method of setting an intermediate region is not limited thereto. For example, the value of r may be dynamically determined based on distance values around the in-focus region according to depth image data 314, instead of being fixed. r may be increased in a case where distance values around the in-focus region do not vary widely and may be decreased in a case where distance values vary widely. Alternatively, the value of r may be determined based on a virtual depth of field of synthesized image data 316. For example, r may be increased in a case where synthesized image data 316 has a great depth of field and may be decreased in a case where synthesized image data 316 has a shallow depth of field. The virtual depth of field of synthesized image data 316 can be determined from virtual diaphragm parameters 311. If the coefficients of the virtual diaphragm parameters 311 are determined according to a Gaussian function, the depth can be determined from the value of a standard deviation that defines the Gaussian function. The smaller the standard deviation, the greater the depth. The greater the standard deviation, the shallower the depth.

(Image Synthesis Processing)

Now, the image synthesis processing performed in step S406 will be described. The image synthesis processing differs from that of the first exemplary embodiment only in the weighted addition processing performed in step S1103. The weighted addition processing according to the present exemplary embodiment will be described below.

Figure 17:
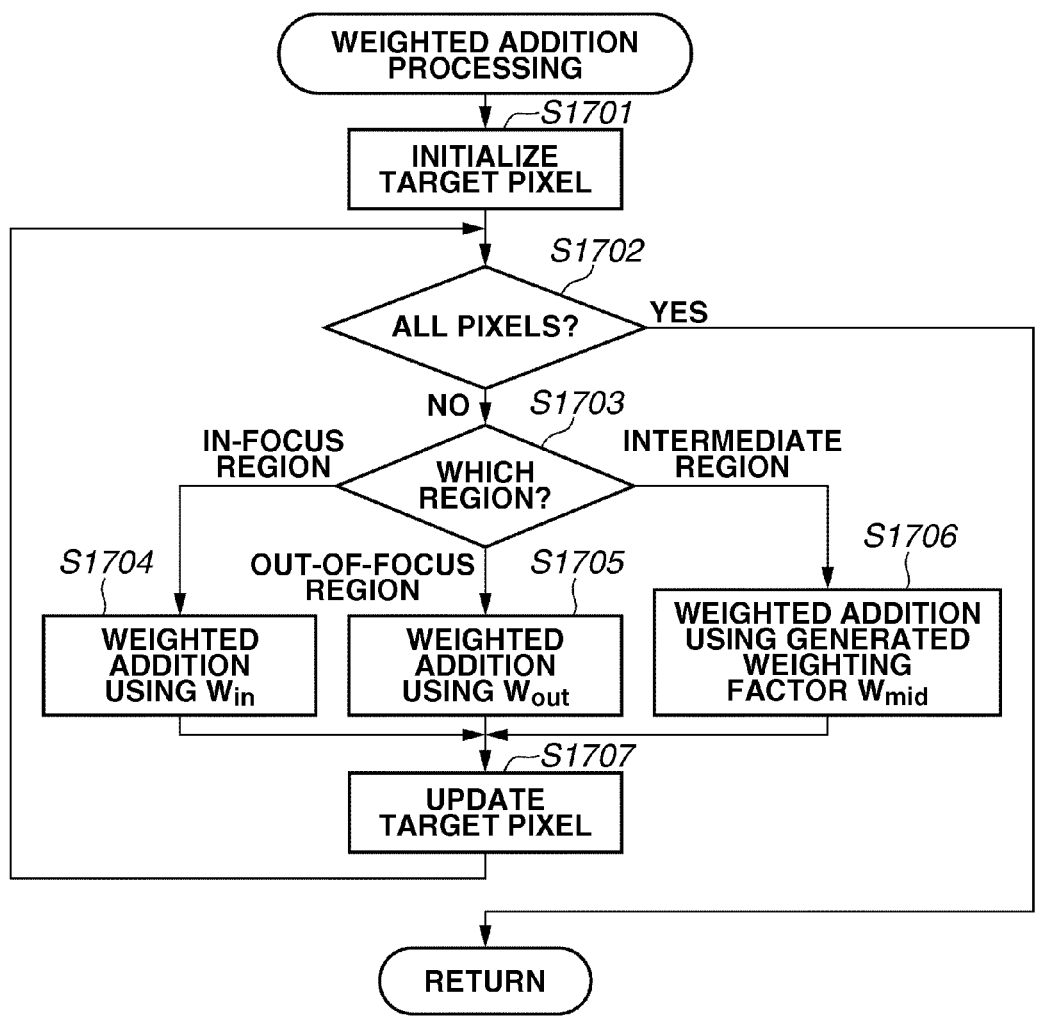
FIG. 17 is a flowchart illustrating a procedure for weighted addition according to the second exemplary embodiment.

The weighted addition processing will be described in detail with reference to the flowchart illustrated in FIG. 17.

In step S1701, the image synthesis processing unit 306 first initializes a target pixel (i,j). In step S1702, the image synthesis processing unit 306 determines whether the weighted addition processing has been performed on all pixels. If there is any unprocessed pixel (NO in step S1702), the image synthesis processing unit 306 proceeds to step S1703. If all the pixels have been processed (YES in step S1702), the image synthesis processing unit 306 ends the weighted addition processing. In step S1703, the image synthesis processing unit 306 refers to the region-divided image data 315 and determines whether the target pixel (i,j) is included in an in-focus region, an out-of-focus region, or an intermediate region. If the target pixel (i,j) is included in an in-focus region (IN-FOCUS REGION in step S1703), the image synthesis processing unit 306 proceeds to step S1704. If the target pixel (i,j) is included in an out-of-focus region (OUT-OF-FOCUS REGION in step S1703), the image synthesis processing unit 306 proceeds to step S1705. If the target pixel (i,j) is included in an intermediate region (INTERMEDIATE REGION in step S1703), the image synthesis processing unit 306 proceeds to step S1706. In step S1704, the image synthesis processing unit 306 performs a weighted addition by using a weighting factor $W_{in}$. With synthesized image data 316 denoted by H, the image synthesis processing is expressed by the following equation (8):

$$H(i, j) = \sum_m w_{in}(m) I_m(i + \Delta i(m, d), j + \Delta j(m, d)) \quad (8)$$

Equation (8) means that synthesized image data 316 is obtained by multiplying pieces of captured image data or interpolation image data $I_m$ by respectively set weighting factors $W_{in}$, shifting the pieces of image data $I_m$ based on the amounts of shift $\Delta i$ and $\Delta j$, and adding up the resultant.

In step S1705, the image synthesis processing unit 306 performs a weighted addition by using a weighting factor $W_{out}$. With synthesized image data 316 denoted by H, the image synthesis processing is expressed by the following equation (9):

$$H(i, j) = \sum_m w_{out}(m) I_m(i + \Delta i(m, d), j + \Delta j(m, d)) \quad (9)$$

Equation (9) means that synthesized image data 316 is obtained by multiplying pieces of captured image data or interpolation image data $I_m$ by respectively set weighting factors $W_{out}$, shifting the pieces of image data $I_m$ based on the amounts of shift $\Delta i$ and $\Delta j$, and adding up the resultant.

In step S1706, the image synthesis processing unit 306 generates a weighting factor $W_{mid}$ based on weighting factors $W_{in}$ and $W_{out}$, and performs a weighted addition by using the weighting factor $W_{mid}$. The image synthesis processing unit 306 calculates the weighting factor $W_{mid}$ by interpolation processing as expressed by the following equation (10):

$$w_{mid}(m) = \alpha w_{in}(m) + (1-\alpha) w_{out}(m), \quad (10)$$

where α is a coefficient ranging between 0 and 1 inclusive. α is determined by the distance r that defines the range of the intermediate region, and a distance from the in-focus region to the target pixel (i,j). The value of α approaches 1 as the target pixel (i,j) lies closer to the in-focus region. The value of α approaches 0 as the target pixel (i,j) lies closer to the out-of-focus region. With synthesized image data 316 denoted by H, image synthesis processing using weighting factors $W_{mid}$ is expressed by the following equation (11):

$$H(i, j) = \sum_m w_{mid}(m) I_m(i + \Delta i(m, d), j + \Delta j(m, d)) \quad (11)$$

Equation (11) means that synthesized image data 316 is obtained by multiplying pieces of captured image data or interpolation image data $I_m$ by respectively set weighting factors $W_{mid}$, shifting the pieces of image data $I_m$ based on the amounts of shift $\Delta i$ and $\Delta j$, and adding up the resultant.

In step S1707, the image synthesis processing unit 306 updates the target pixel (i,j), and returns to step S1702.

The processing described above can be performed to generate an image having a shallower depth of field from a plurality of images while connecting a region within the depth of field and a region outside the depth of field with a smooth boundary and blurring the region outside the depth of field with a high image quality without blurring the region within the depth of field.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-119255 filed May 27, 2011, which is hereby incorporated by reference herein in its entirety.

What is claimed is:

1. An image processing apparatus comprising:
a memory;
a processor coupled to the memory which executes the following:
inputting captured image data which includes a plurality of captured images obtained by capturing an object from a plurality of viewpoints;
generating, based on the captured image data, interpolation image data which includes an interpolation image to be obtained in capturing the object from a viewpoint other than the plurality of viewpoints;
setting weighting factors of the plurality of captured images and the interpolation image used for weighted synthesis of the plurality of captured images and the interpolation image, wherein the setting is configured to set the weighting factors region by region of a synthesized image to be generated by the weighted synthesis, based on in-focus state information indicating an in-focus region of the synthesized image, wherein the in-focus region is an image region that is in focus; and
synthesizing, based on the weighting factors set, the plurality of captured images and the interpolation image to generate synthesized image data which includes the synthesized image,
wherein the setting is configured to set the weighting factors so that a weighting factor of the interpolation image in the in-focus region of the synthesized image is smaller than a weighting factor of the interpolation image in at least a part of a region in the synthesized image other than the in-focus region.

2. The image processing apparatus according to claim 1, wherein the regions are pixels.

3. The image processing apparatus according to claim 1, further comprising:
inputting focal length information indicating a focal length; and
acquiring distances to an object in the respective regions, and
wherein the in-focus state information indicating the in-focus region is determined based on the focal length information and the distances to the object.

4. The image processing apparatus according to claim 3, configured to acquire the distances to the object based on the captured image data.

5. The image processing apparatus according to claim 3, further comprising inputting depth-of-field information indicating a depth of field, and
wherein the in-focus state information indicating the in-focus region is determined based on the focal length information, the depth-of-field information, and the distances to the object.

6. The image processing apparatus according to claim 1, wherein the weighting factor for the interpolation image data in the in-focus region is zero.

7. The image processing apparatus according to claim 1, further comprising setting an intermediate region between the in-focus region and the region other than the in-focus region, and
synthesizing the captured image data and the interpolation image data in the intermediate region by using a weighting factor intermediate between the weighting factor for the interpolation image data in the in-focus region and the weighting factor for the interpolation image in the region other than the in-focus region.

8. An image processing method comprising:
inputting captured image data which includes a plurality of captured images obtained by capturing an object from a plurality of viewpoints;
generating, based on the captured image data, interpolation image data which includes an interpolation image to be obtained in capturing the object from a viewpoint other than the plurality of viewpoints;
setting weighting factors of the plurality of captured images and the interpolation image region by region of a synthesized image to be generated by a weighted synthesis, based on in-focus state information indicating an in-focus region of the synthesized image, so that a weighting factor of the interpolation image in the in-focus region of the synthesized image is smaller than a weighting factor of the interpolation image in at least a part of a region in the synthesized image other than the in-focus region, wherein the in-focus region is an image region that is in focus; and
synthesizing, based on the weighting factors set, the plurality of captured images and the interpolation image to generate synthesized image data which includes the synthesized image.

9. A non-transitory computer-readable storage medium storing a computer-executable program, the program comprising code for:
inputting captured image data which includes a plurality of captured images obtained by capturing an object from a plurality of viewpoints;
generating, based on the captured image data, interpolation image data which includes an interpolation image to be obtained in capturing the object from a viewpoint other than the plurality of viewpoints;
setting weighting factors of the plurality of captured images and the interpolation image region by region of a synthesized image to be generated by a weighted synthesis, based on in-focus state information indicating an in-focus region of the synthesized image, so that a weighting factor of the interpolation image in the in-focus region of the synthesized image is smaller than a weighting factor of the interpolation image in at least a part of a region in the synthesized image other than the in-focus region, wherein the in-focus region is an image region that is in focus; and
synthesizing, based on the weighting factors set, the plurality of captured images and the interpolation image to generate synthesized image data which includes the synthesized image.

10. The image processing apparatus according to claim 1, wherein setting a weighting factor of an image based also on whether the image is an interpolation image or not and sets a weighting factor for a captured image at the in-focus region of the synthesized image to be larger than a weighting factor for an interpolation image in the same region.

11. An image processing apparatus comprising:

a memory;

a processor coupled to the memory which executes the following:

generating, by performing image synthesis, a synthesized image whose pixel value is a weighted sum of pixel values of corresponding pixels in a plurality of captured images obtained by capturing an object from a plurality of viewpoints and an interpolation image which is to be obtained in capturing the object from a viewpoint other than the plurality of viewpoints and generated based on the plurality of images; and inputting in-focus state information indicating an in-focus region of the synthesized image, wherein the generating is configured to perform the image synthesis based on the in-focus state information so that a weight of the interpolation image in the in-focus region of the synthesized image is smaller than a weight of the interpolation image in at least a part of a region in the synthesized image other than the in-focus region, wherein the in-focus region is an image region that is in focus.

* * * * *